(12) United States Patent
Wears et al.

(10) Patent No.: US 7,014,170 B2
(45) Date of Patent: Mar. 21, 2006

(54) SEAT RING FOR VALVES

(75) Inventors: William E. Wears, Marshalltown, IA (US); Lynn D. Mahncke, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 0 days.

(21) Appl. No.: 10/903,571

(22) Filed: Jul. 30, 2004

(65) Prior Publication Data

US 2005/0029485 A1 Feb. 10, 2005

Related U.S. Application Data

(63) Continuation-in-part of application No. 10/336,476, filed on Jan. 3, 2003, now Pat. No. 6,789,784.

(51) Int. Cl.
*F16K 31/00* (2006.01)

(52) U.S. Cl. ...................................... 251/360
(58) Field of Classification Search ............... 251/359, 251/360
See application file for complete search history.

(56) References Cited

U.S. PATENT DOCUMENTS

| | | | |
|---|---|---|---|
| 2,104,419 A | 1/1938 | Frye | |
| 2,192,339 A | 3/1940 | Wilson | |
| 3,467,357 A | 9/1969 | Schomer et al. | |
| 3,746,305 A | 7/1973 | Zakka | |
| 4,105,187 A | 8/1978 | Huber | |
| 4,474,208 A | 10/1984 | Looney | |
| 4,542,879 A | 9/1985 | Stein | |
| 5,758,682 A | 6/1998 | Cain | |
| 6,641,112 B1 | 11/2003 | Antoff et al. | |
| 6,698,450 B1 * | 3/2004 | Vicars | 137/542 |

FOREIGN PATENT DOCUMENTS

| | | |
|---|---|---|
| CH | 320481 | 3/1957 |
| EP | 0750163 A2 | 12/1996 |
| GB | 233850 | 5/1925 |
| GB | 2018397 A | 10/1979 |

OTHER PUBLICATIONS

Copy of International Search Report for PCT/US03/38765, mailed Mar. 30, 2004, 5 pages.
Sectional and Profile views of 1018S valve product.
Inventor's drawing showing narrow angle detail of prior art valve.
Drawing from Samson website.

* cited by examiner

*Primary Examiner*—Justine R. Yu
*Assistant Examiner*—John K. Fristoe, Jr.
(74) *Attorney, Agent, or Firm*—Marshall, Gerstein & Borun LLP

(57) ABSTRACT

A valve seat assembly includes a valve body defining a cavity having an axis, the cavity having a threaded receiving portion and a conical contact surface substantially concentric with the threaded receiving portion. The valve seat assembly further includes a seat ring formed about a center axis having a threaded portion to engage the valve body threaded receiving portion. The seat ring also having an outer surface including a curved contact surface sized to sealingly engage the conical contact surface wherein the curved contact surface is slidable over the conical contact surface to position the seat ring so that the seat ring center axis is substantially aligned with the cavity axis.

21 Claims, 3 Drawing Sheets

SEAT RING FOR VALVES

RELATED APPLICATIONS

This is a continuation-in-part of U.S. patent application Ser. No. 10/336,476 entitled "Improved Seat Ring for Valves" which was filed on Jan. 3, 2003, now U.S. Pat. No. 6,789,784, and which is hereby expressly incorporated by reference herein.

FIELD OF THE DISCLOSURE

The present invention relates generally to seat rings and, more specifically, to an improved seat ring and valve assembly having improved alignment features, reduced torque requirements, and reduced leakage.

BACKGROUND OF THE DISCLOSURE

Conventional globe style control valves and other types of valves commonly include screwed-in or clamped-in seat rings. Seat rings are typically inserted into a cylindrical cavity formed within a valve body of a valve and include an annular thrust-bearing rim against which a valve plug may be applied to close the valve. The seat ring is subject to wear and, therefore, is typically formed as a removable part to facilitate replacement. Several economical materials can be used to construct seat rings, including steel, stainless steel, and hardened materials such as stellited, ceramic, and Tungsten carbide. The clamped-in seat ring typically requires a compressed gasket to seal the seat ring and prevent fluid leakage. The clamped construction typically requires additional parts and complexity due to the load that is needed in the valve assembly to compress the gasket. Screwed-in seat rings, on the other hand, generally do not require a gasket, but rely on a metal-to-metal sealing formed by complementary surfaces formed in the seat ring and the valve body. However, conventional screwed-in seat rings suffer certain alignment disadvantages, concentricity disadvantages, and seal limitations as described below.

FIG. 1 is a cross-sectional view of prior art seat ring valve assembly 10, which includes seat ring 100 screwed into an interior cylindrical sidewall surface 122 of valve body 120. Seat ring 100 includes annular thrust-bearing rim 102, which engages a valve plug 160 to close the valve. When in the closed position, the valve plug 160 is compressed against the seat ring 100 and prevents fluid from flowing through a passage 152 created when the valve plug is lifted from the seat ring. The seat ring 100 further includes an exterior cylindrical sidewall 112, which is generally formed at a 90-degree angle to an upper flange 113 and faces an interior cylindrical surface 138 of the valve body 120 (described in more detail below). Just below the cylindrical sidewall 112, a tapered exterior surface 132 extends generally downward and toward a center of the seat ring 100. The cylindrical sidewall 112 is sloped to complement a tapered valve body surface 136 of the valve body 120. Both tapered surfaces, 132 and 136, are typically manufactured to be oriented at approximately 45 degrees with respect to a center axis 137 along which the plug actuates. Engagement of the tapered surfaces, 132 and 136, forms a primary seal 106 between the seat ring 100 and the valve body 120. Below this sealing surface, a first threaded portion 104 of the seat ring 100 mates with a second threaded portion 110 of the valve body 120, which helps secure and guide the seat ring 100 into the cavity 130. The threaded engagement also provides a secondary seal.

The effectiveness of primary seal 106, however, is highly dependent on the alignment (meaning straightness and centering) of the seat ring 100 within the cavity 130. If the seat ring 100 is misaligned, a tight uniform circular seal will not occur because certain sections of the primary seal 106 will have gaps, particularly where there are minute surface flaws in the metal, resulting in unacceptable leakage between the seat ring 100 and the valve body 120. Additionally, the effectiveness of the seal formed by the interface of the thrust-bearing rim 102 and the valve plug 160 is also highly dependent on the alignment of the seat ring 100 within the cavity 130. In this case, if the seat ring 100 is misaligned with respect to the center axis 137, then the thrust-bearing rim 102 is correspondingly misaligned with respect to the center axis. Therefore, as the valve plug 160 closes, it will fail to form a tight circular seal with the thrust-bearing rim 102. Unfortunately, conventional screwed-in seat ring assemblies of this type are particularly susceptible to misalignment resulting in leakage for at least three reasons. First, conventional screwed-in seat rings rely on their mated threads to provide alignment and a secondary seal. However, industry standard threads typically include relatively loose tolerance requirements, resulting in excessive clearance or play between the mating threaded parts. Conventional valve seat assemblies use the threaded connection between the seat ring 100 and valve body 120 to position the seat ring, and therefore the ultimate location of the thrust-bearing rim 102 may vary. The valve plug 160 is movably positioned with respect to the valve body 120, and therefore the imprecise location of the seat ring 100 within the valve body cavity 130 increases the uncertainty that the seat ring 100 and plug 160 will be concentric. As used herein, the terms "concentric" and "concentricity" mean that a center axis of the seat ring 100 and the center axis 137 are substantially aligned. Both the valve plug 160 and the valve body 120 are concentric with respect to the center axis, thus a lack of thrust-bearing rim 102 concentricity may result in misalignment of the valve plug 160 causing leakage. Second, the area in which the sidewall 112 joins the tapered exterior surface 132 of the seat ring 100 is formed as a sharp edge that may contact the valve body surface 136 during assembly. As such, minute surface imperfections or irregularities in this edge area may result in significant misalignment, therefore small machining tolerances are required. Third, the relatively shallow angle (45 degrees) of the valve body surface 136 does not sufficiently direct the seat ring 100 toward the center of the cavity 130, causing the seat ring 100 to be susceptible to misalignment. In other words, a conventional seat ring is particularly susceptible to leakage because it is either not properly centered, misaligned, or both, causing at least a portion of the seal 106 to be susceptible to leakage where there is insufficient contact between mating surfaces.

The effectiveness of the primary seal 106 is also highly dependent on tolerances associated with the tapered surfaces, 132 and 136. Normal industry standards introduce tolerance differences between the tapered valve body surface 136 which prevent true parallel sealing surfaces. Such tolerance differences prevent a tight uniform seal resulting in unacceptable leakage between the seat ring 100 and the valve body 120. Additionally, the aforementioned problems caused by thread clearance are further exacerbated by such tolerance differences.

Alternatively, in light of the difficulty of controlling tolerances when manufacturing parallel surfaces, intentional angular deviations between the sealing surfaces present similar problems. In such a configuration, the sharp edge of the sidewall surface 112 tends to engage and impinge (i.e., dig into) to the tapered surface 136, which may also cause misalignment between the thrust-bearing rim 102 and the valve plug 160. To compensate for these limitations and to reduce leakage to an acceptable level, the assembler must apply an unacceptably high level of torque to the seat ring 100 to excessively compress it within the cavity 130. The required excessive compression creates a complicated assembly process, causes torque stress on the assembly parts, and contributes to a high failure rate of the primary seal 106.

What is needed is an improved seat ring valve assembly having self-aligning characteristics for creating a stronger seal with reduced leakage without requiring an unacceptably high level of torque during assembly.

Figure 1:
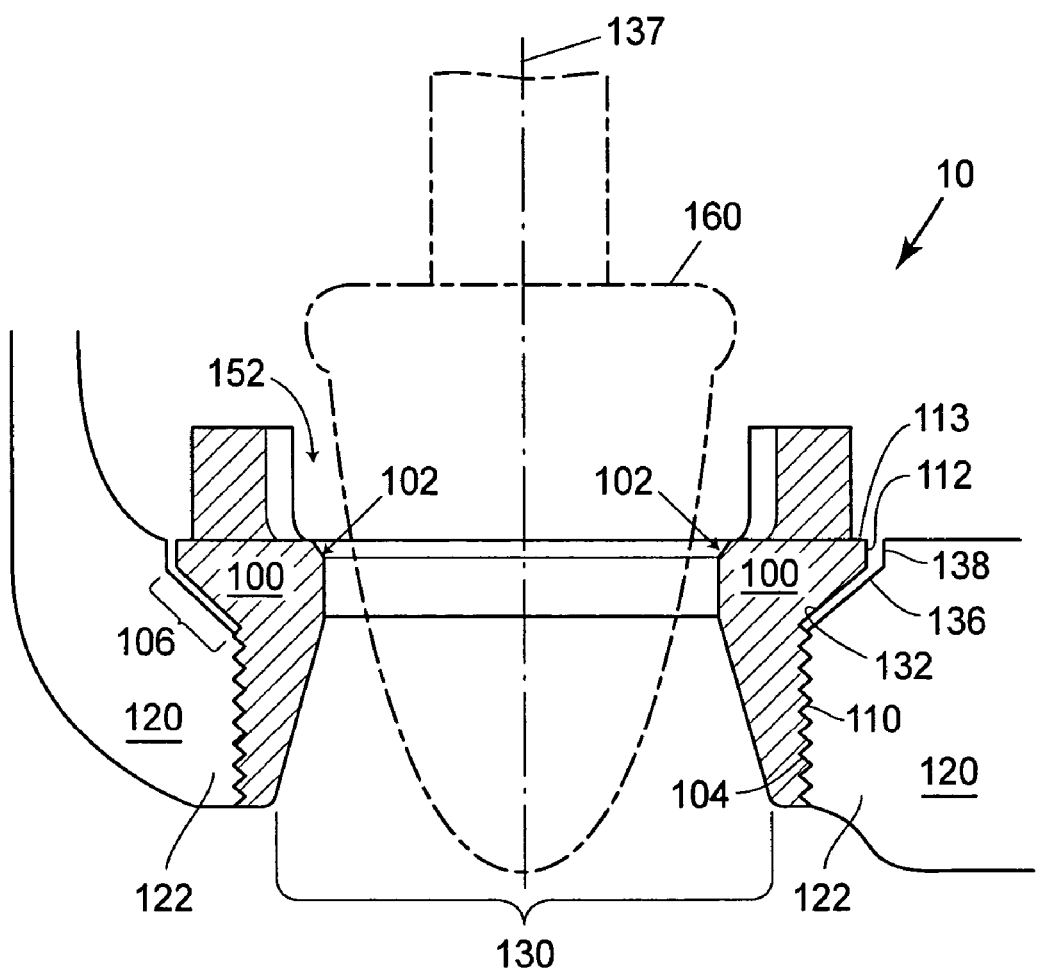
FIG. 1 is a cross-sectional view of a prior art seat ring valve assembly.

While the disclosure is susceptible to various modifications and alternative constructions, certain illustrative embodiments thereof are shown in the drawings and will be described below in detail. It should be understood, however, that there is no intention to limit the disclosure to the specific embodiments disclosed, but on the contrary, the intention is to cover all modifications, alternative constructions, and equivalents falling within the spirit and scope of the disclosure as defined by the appended claims.

DETAILED DESCRIPTION

Figure 2:
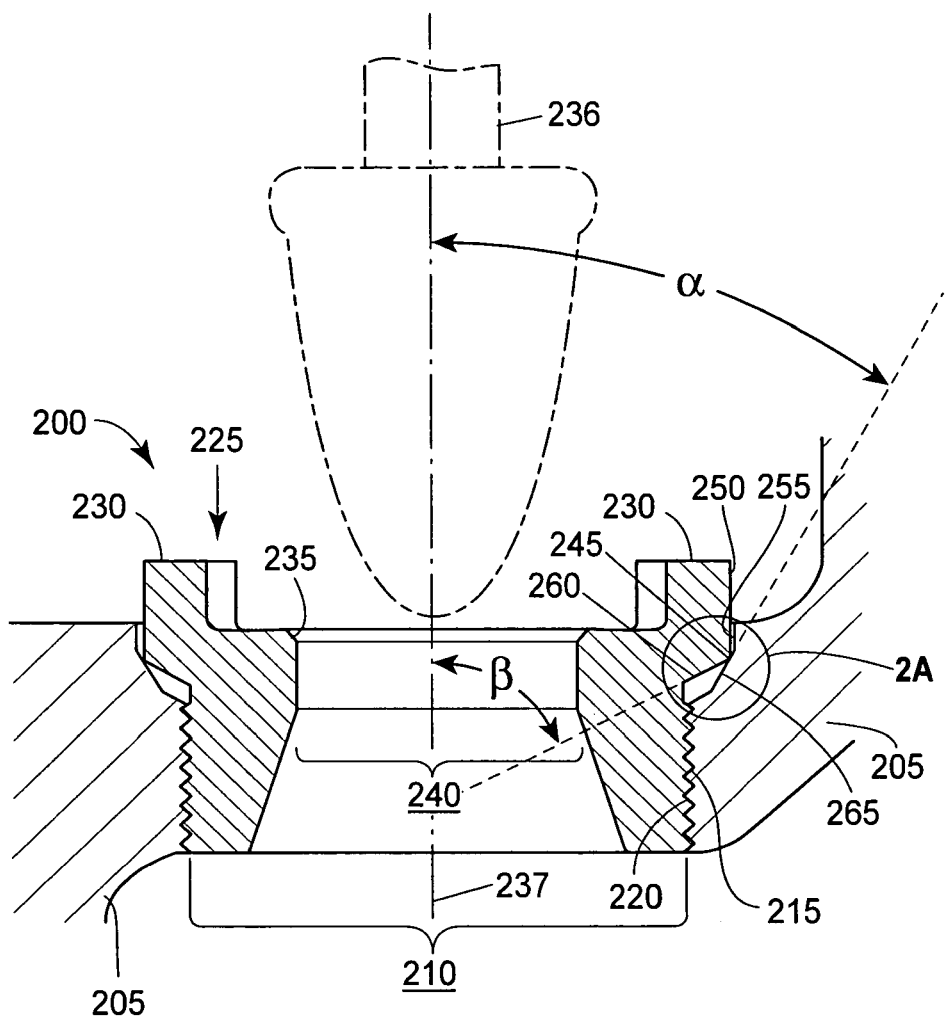
FIG. 2 is a cross-sectional view of an improved seat ring valve assembly in accordance with a first embodiment of the present disclosure.

Referring now to FIG. 2, a cross-sectional view of a substantially cylindrical seat ring valve assembly 200 is shown. Valve body 205 includes a valve body cavity 210 and valve body threads 215 for receiving seat ring threads 220 of seat ring 225. The seat ring 225 further includes a lug portion 230 used to threadably secure the seat ring 225 to the valve body 205 as shown. A special tool (not shown) interfaces with the lug portion 230 to threadably rotate the seat ring 225 into or out of the valve body 205. For convenience, the combination of seat ring 225 and valve body 205 is referred to as a seat ring valve assembly 200. Seat ring 225 has an annular thrust-bearing rim 235 sized to engage a valve plug 236, thereby to close the seat ring valve assembly. The valve plug 236 may be actuated to a position spaced away from the rim 235, known as the open position, to allow fluid to flow through a seat ring cavity 240.

In accordance with the present disclosure, rather than parallel tapered surfaces (surfaces 132 and 136 of FIG. 1) or a sharp edge (such as the edge formed between the upper flange 113 and angled side wall 112 of FIG. 1) to form a primary seal, a curved contact surface 245 is formed between the seat ring 225 and the valve body 205. As shown, the lug portion 230 of the seat ring includes a substantially cylindrical exterior sidewall surface 250, which generally extends at a 90-degree angle from a top surface of the lug portion 230, a portion of the exterior sidewall surface 250 faces an interior surface 255 of the valve body 205. Below the lug portion 230, the seat ring 225 has a tapered surface 260 that is oriented at an angle β with respect to a center axis 237 as illustrated in FIG. 2. The angle β is shown in FIG. 2 having an orientation of approximately 45 degrees, although alternate angles may be used, as discussed and shown later.

The curved contact surface 245 joins the sidewall surface 250 and the tapered surface 260, the contact surface 245 operating as the primary seal between the seat ring 225 and a conical contact surface 265 of the valve body 205. The curved contact surface 245 is an arcuate, curved, or radiused surface that extends between the sidewall surface 250 and the tapered surface 260. Preferably, the curved contact surface 245 is formed to have a radius of approximately 0.03 inches, however other geometries and/or radii may be used. The conical contact surface 265 of the valve body 205 is preferably formed at an angle (α) that is less than the angle β of the tapered surface 260. In this illustrated embodiment, the angle α is approximately 30 degrees, however other angles preferably in the range of 10 to 40 degrees could be used.

The relatively small angle a creates a relatively steep conical contact surface 265 with respect to the tapered surface 260 when the valve is oriented as shown in the Figures. The steep angle ensures that the curved contact surface 245 will engage the surface 265. The conical surface 265, therefore, directs the seat ring 225 toward the center of the valve body cavity 210, thereby more reliably aligning the center axes of the thrust-bearing rim 235 of the seat ring 225 with the valve plug 236. A wedging and sliding effect of the conical contact surface 265 additionally prevents tilting of the plane perpendicular to the center axis 237 and uniformly guides the seat ring 225 to a low center point within the valve body cavity 210. Once in place, the valve body threads 215 and seat ring threads 220 may secure the valve body 205 and seat ring 225 together without concern that thread tolerance, and resulting clearance, will affect their concentricity. Because the area of the seat ring that contacts the conical contact surface 265 is curved (i.e., the curved contact surface 245), the seat ring 225 more easily slides along the conical surface 265 rather than engaging and digging into the surface as seen with conventional seat rings.

Figure 2A:
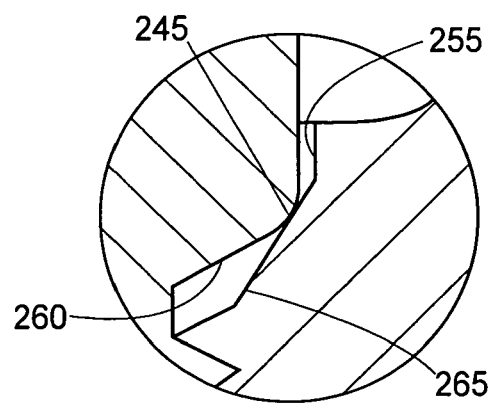
FIG. 2A is an exploded view detail of FIG. 2 in accordance with the first embodiment of the present disclosure.

FIG. 2A is an exploded view detail of FIG. 2 showing the tapered surface 260, the curved contact surface 245, and the conical contact surface 265 in greater detail.

Figure 3:
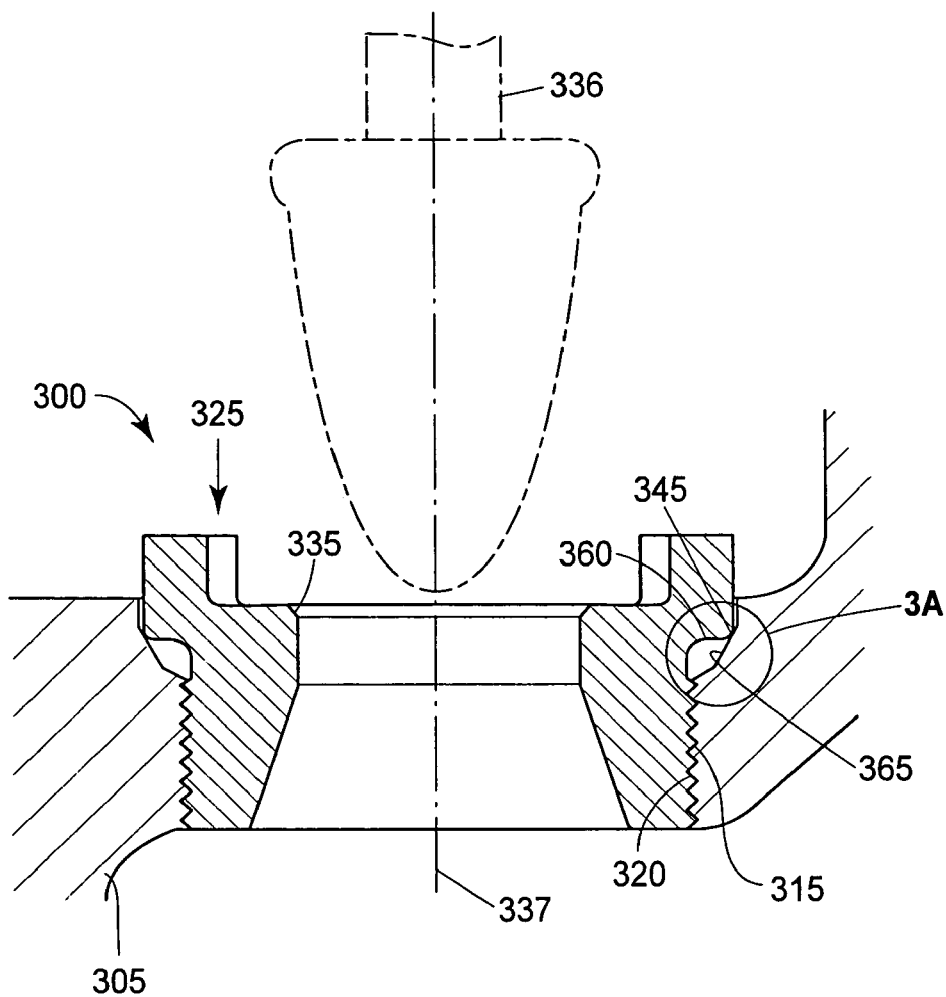
FIG. 3 is a cross-sectional view of an improved seat ring valve assembly in accordance with a second embodiment of the present disclosure.

Referring now to FIG. 3 (having similar numerical identification numbers of FIG. 2, offset by 100), a cross-sectional view of a second embodiment of a seat ring valve assembly 300 is shown having a substantially cylindrical seat ring 325 and valve body 305. The valve assembly 300 of FIG. 3 shows alternate geometries of a tapered surface 360 and a curved contact surface 345 than the embodiment of FIG. 2. As with the previous embodiment, a conical contact surface 365 centers and aligns a thrust-bearing rim 335 of the seat ring 325, rather than the threaded engagement of the receiving seat ring threads 320 and valve body threads 315. During the axial alignment between the seat ring 325 and the valve body 305, the curved contact surface 345 easily slides along the conical contact surface 365 (i.e., does not "dig-in" to the surface) to facilitate movement of the seat ring 325 toward the proper position. With the seat ring 325 so aligned, it may easily be threaded without requiring extremely high torque to sealingly engage the curved contact surface 345 with the conical contact surface 365. Furthermore, the seat ring 325 concentricity ensures that a valve plug 336 seats properly on the thrust-bearing rim 335, thereby preventing leakage.

Figure 3A:
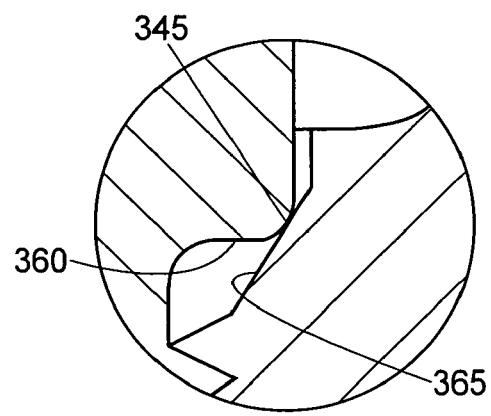
FIG. 3A is an exploded view detail of FIG. 3 in accordance with the second embodiment of the present disclosure.

FIG. 3A is an exploded view detail of FIG. 3 showing the tapered surface 360, the curved contact surface 345, and the conical contact surface 365 in greater detail. As can be seen with reference to FIG. 3A, the tapered surface 360 is substantially perpendicular to a center axis 337 so that the curved contact surface 345 defines an arc having a central angle of approximately 90 degrees.

The curved contact surface described above significantly reduces the torque requirements during assembly and minimizes the effects of minute flaws in the metal contact surface. Also, the curved contact surface described above has another advantage of self-aligning a seat ring within a cavity during installation by reducing the area needed for alignment to form the seal.

While the invention is susceptible to various modifications and alternative forms, specific embodiments thereof have been shown by way of example in the drawings and as described above. It should be understood, however, that there is no intent to limit the invention to the particular forms disclosed. For example, as shown in FIGS. 3 and 3A, the tapered portion 260 could be other angles or geometries to form the transition from the curved contact surface 245 to the threaded portion 220. In addition, while the illustrated embodiments show curved contact surfaces having substantially uniform radii, the contact surface may be simply curved or arcuate with a non-uniform radius. Further, the shape and style of the annular thrust-bearing to accommodate a valve plug may vary depending on the type of valve plug used. Also, in view of the detailed discussion above, one skilled in the art should appreciate that the seat ring valve assembly described below may be incorporated into any conventional valve, such as an on/off valve or globe style control valve. Other modifications should also become apparent in view of the above disclosure without departing from the spirit and scope of the claimed invention.

What is claimed is:

1. A valve seat assembly comprising:
   a valve body defining a cavity having an axis, the cavity including a threaded receiving portion, and a conical contact surface substantially concentric with the threaded receiving portion; and
   a seat ring formed about a center axis and having a threaded portion adapted to threadably engage the valve body threaded receiving portion, an outer surface of the seat ring including a curved contact surface sized to sealingly engage the conical contact surface, wherein the curved contact surface is slidable over the conical contact surface to position the seat ring so that the seat ring center axis is substantially aligned with the cavity axis.

2. The valve seat assembly of claim 1, in which the curved contact surface comprises a radiused contact surface.

3. The valve seat assembly of claim 2, in which the radiused contact surface is formed about a radius of approximately 0.03 inches.

4. The valve seat assembly of claim 1, in which the seat ring outer surface includes a tapered surface and a sidewall surface, and the curved contact surface extends between the tapered surface and the sidewall surface.

5. The valve seat assembly of claim 4, in which the tapered surface is oriented at approximately 45-degrees with respect to the seat ring center axis.

6. The valve seat assembly of claim 1, in which the conical contact surface of the valve body is oriented at approximately 10-degrees to 40-degrees with respect to the valve body center axis.

7. The valve seat assembly of claim 1, in which the conical contact surface of the valve body is oriented at least 10-degrees with respect to the valve body cavity axis.

8. The valve seat assembly of claim 1, in which the seat ring further includes an annular thrust-bearing rim sized to sealingly engage a valve plug.

9. The valve seat assembly of claim 8, in which the annular thrust-bearing rim is substantially aligned with the cavity axis.

10. The valve seat assembly of claim 8, in which the valve plug is substantially aligned with the cavity axis.

11. The valve seat assembly of claim 8, the seat ring further including a seat ring cavity, the valve plug preventing fluid flow through the seat ring cavity when engaged to the thrust-bearing rim, and the valve plug allowing fluid flow through the seat ring cavity when spaced away from the thrust-bearing rim.

12. A method of assembling a valve seat assembly, comprising:
   providing a valve body, the valve body having a threaded cavity formed about a center axis and a conical contact surface;
   providing a seat ring formed about a center axis, the seat ring having a threaded portion adapted to threadably engage the threaded cavity, and a curved contact surface sized to engage the conical contact surface;
   inserting the seat ring into the valve body, the curved contact surface sliding over the conical contact surface so that the seat ring center axis is substantially aligned with the threaded cavity center axis; and
   threadably engaging the seat ring threaded portion to the threaded cavity, so that the curved contact surface of the seat ring sealingly engages the conical contact surface of the valve body.

13. The method of claim 12, in which the curved contact surface comprises a radiused contact surface.

14. The method of claim 13, in which the radiused contact surface is formed about a radius of approximately 0.03 inches.

15. The method of claim 12, in which the seat ring outer surface includes a tapered surface and a sidewall surface, and the curved contact surface extends between the tapered surface and the sidewall surface.

16. The method of claim 15, in which the tapered surface is oriented at approximately 45-degrees with respect to the seat ring center axis.

17. The method of claim 12, in which the conical contact surface of the valve body is oriented at approximately 10-degrees to 40-degrees with respect to the valve body center axis.

18. The method of claim 12, in which the conical contact surface of the valve body is oriented at least 10-degrees with respect to the valve body center axis.

19. The method of claim 12, further including an annular thrust-bearing rim on the seat ring, the annular thrust-bearing rim sealingly receiving a valve plug.

20. The method of claim 19, in which the annular thrust-bearing rim is substantially aligned with the seat ring center axis.

21. The method of claim 19, the seat ring further including a seat ring cavity, the valve plug preventing fluid flow through the seat ring cavity when engaged to the thrust-bearing rim, and the vale plug allowing fluid flow through the seat ring cavity when spaced away from the thrust-bearing rim.

* * * * *

UNITED STATES PATENT AND TRADEMARK OFFICE
CERTIFICATE OF CORRECTION

| | | |
|---|---|---|
| PATENT NO. | : 7,014,170 B2 | Page 1 of 1 |
| APPLICATION NO. | : 10/903571 | |
| DATED | : March 21, 2006 | |
| INVENTOR(S) | : William E. Wears et al. | |

It is certified that error appears in the above-identified patent and that said Letters Patent is hereby corrected as shown below:

At Column 4, line 22, "a" should be -- α --.

In the Claims:

At Column 6, line 63, "vale" should be -- valve --.

Signed and Sealed this

First Day of May, 2007

JON W. DUDAS
*Director of the United States Patent and Trademark Office*